(12) United States Patent
Figueroa et al.

(10) Patent No.: US 11,366,593 B2
(45) Date of Patent: *Jun. 21, 2022

(54) POINT-IN-TIME BACKUPS VIA A STORAGE CONTROLLER TO AN OBJECT STORAGE CLOUD

(71) Applicant: INTERNATIONAL BUSINESS MACHINES CORPORATION, Armonk, NY (US)

(72) Inventors: Ernesto E. Figueroa, Sahuarita, AZ (US); Robert S. Gensler, Jr., Beavercreek, OH (US); David M. Shackelford, Tucson, AZ (US); Jeffrey R. Suarez, Tucson, AZ (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/131,541

(22) Filed: Dec. 22, 2020

(65) Prior Publication Data
US 2021/0109663 A1 Apr. 15, 2021

Related U.S. Application Data

(63) Continuation of application No. 16/411,013, filed on May 13, 2019, now Pat. No. 10,936,208, which is a continuation of application No. 15/353,114, filed on Nov. 16, 2016, now Pat. No. 10,346,062.

(51) Int. Cl.
*G06F 3/06* (2006.01)

(52) U.S. Cl.
CPC ............ *G06F 3/0619* (2013.01); *G06F 3/065* (2013.01); *G06F 3/067* (2013.01)

(58) Field of Classification Search
CPC ......... G06F 3/0619; G06F 3/065; G06F 3/067
See application file for complete search history.

(56) References Cited

U.S. PATENT DOCUMENTS 6,910,214 B1   6/2005  Reed et al.
7,287,045 B2  10/2007  Saika et al.
(Continued)

FOREIGN PATENT DOCUMENTS

CN   102591744 A   7/2012
CN   105677516 A   6/2016
(Continued)

OTHER PUBLICATIONS

English translation of CN102591744A dated Jul. 18, 2012.
(Continued)

*Primary Examiner* — David Yi
*Assistant Examiner* — Nicholas A. Paperno
(74) *Attorney, Agent, or Firm* — Konrad Raynes Davda & Victor LLP; Rabindranath Dutta

(57) ABSTRACT

A storage controller receives a command from a host application to perform a point-in-time backup of a source dataset to a storage cloud. The storage controller generates a target dataset via a point-in-time copy of the source dataset, and a mapping that indicates a correspondence between locations of the source dataset and locations of the target dataset. The storage controller copies the target dataset to the storage cloud to generate a backup dataset that is the point-in-time backup of the source dataset, wherein the backup dataset is accessible via reference to the locations of the source dataset.

18 Claims, 10 Drawing Sheets

(56) References Cited

U.S. PATENT DOCUMENTS

| 8,856,080 | B2 | 10/2014 | Khanzode et al. |
|---|---|---|---|
| 10,346,062 | B2 | 7/2019 | Figueroa |
| 2006/0031637 | A1 | 2/2006 | Komikado et al. |
| 2007/0174569 | A1 | 7/2007 | Schnapp et al. |
| 2011/0173404 | A1 | 7/2011 | Eastman et al. |
| 2015/0227601 | A1 | 8/2015 | Ramu et al. |
| 2015/0256617 | A1 | 9/2015 | Klose et al. |
| 2015/0378620 | A1 | 12/2015 | Brown et al. |
| 2016/0077926 | A1 | 3/2016 | Mutalik et al. |
| 2016/0154709 | A1 | 6/2016 | Mitkar et al. |
| 2016/0179568 | A1 | 6/2016 | Bezbaruah et al. |
| 2017/0017553 | A1 | 1/2017 | Peleg |
| 2019/0265896 | A1 | 8/2019 | Figueroa et al. |

FOREIGN PATENT DOCUMENTS

| CN | 106105161 A | 11/2016 |
|---|---|---|
| JP | 2005284609 A | 10/2005 |
| JP | 2006048300 A | 2/2006 |
| JP | 2009129283 A | 6/2009 |
| JP | 2013509646 A | 3/2013 |
| WO | 2013123449 | 8/2013 |
| WO | 2014059175 | 4/2014 |
| WO | 2014111773 | 7/2014 |

OTHER PUBLICATIONS

English translation of CN105677516A dated Jun. 15, 2016.
English translation of CN106105161A dated Nov. 9, 2016.
PCT International Search Report and Written Opinion dated Feb. 2, 2018, pp. 11, for Application No. PCT/IB2017/056860 filed Nov. 3, 2017.
Burger, C., et al., "IBM System Storage DS8000 Series: IBM FlashCopy SE", IBM Corporation, Document No. REDP-4368-00, pp. 1-80, 2008 [retrieved from the internet Feb. 27, 2017][<URL:http://www.redbooks.ibm.com/redpapers/pdfs/redp4368.pdf>] (Year: 2008).
D. Kossman, et al. "An Evaluation of Alternative Architectures for Transaction Processing in the Cloud", Proceedings of the 2010 ACM SIGMOD International Conference on Management of data, ACM, 2010, pp. 12.
List of IBM Patents or Patent Applications Treated as Related, dated Dec. 22, 2020, 2 pp.
Office Action 1 for U.S. Appl. No. 15/353,114, dated Mar. 13, 2018, 17 pp.
Response to Office Action 1 for U.S. Appl. No. 15/353,114, dated Jun. 13, 2018, 14 pp.
Final Office Action 1 for U.S. Appl. No. 15/353,114, dated Aug. 24, 2018, 20 pp.
Response to Final Office Action 1 for U.S. Appl. No. 15/353,114, dated Nov. 26, 2018, 23 pp.
Notice of Allowance 1 for U.S. Appl. No. 15/353,114, dated Feb. 19, 2019, 11 pp.
Office Action 1 for U.S. Appl. No. 16/411,013, dated Jun. 18, 2020, 20 pp.
Response to Office Action 1 for U.S. Appl. No. 16/411,013, dated Sep. 18, 2020, 10 pp.
Notice of Allowance for U.S. Appl. No. 16/411,013, dated Oct. 15, 2020, 9 pp.
Office Action 1 for JP Application No. 2019-524078, dated May 21, 2021, 14 pp. (w/ English Trans).

POINT-IN-TIME BACKUPS VIA A STORAGE CONTROLLER TO AN OBJECT STORAGE CLOUD

CROSS-REFERENCE TO RELATED APPLICATION

This application is a continuation of U.S. patent application Ser. No. 16/411,013 filed May 13, 2019, wherein U.S. patent application Ser. No. 16/411,013 is a continuation of U.S. patent application Ser. No. 15/353,114, filed Nov. 16, 2016, which applications are incorporated herein by reference in their entirety.

BACKGROUND

1. Field

Embodiments relate to point-in-time backups via a storage controller to an object storage cloud.

2. Background

Cloud storage is a model of data storage in which digital data is stored in logical pools, and the physical storage spans a plurality of servers. The physical storage environment may be owned and managed by a hosting company. These cloud storage providers may be responsible for keeping the data available and accessible, and for keeping the physical environment protected and maintained properly. People and organizations may buy or lease storage capacity from the cloud storage providers to store user, organization, or application data.

In certain computing environments, a storage controller allows host computing systems to perform input/output (I/O) operations with a plurality of storage devices controlled by the storage controller. A storage management application that executes in the storage controller may manage the plurality of storage devices, such as disk drives, tape drives, flash drives, direct access storage devices (DASD), etc., that are coupled to the storage controller. A host application that executes in a host computing system may transmit I/O commands to the storage controller and the storage controller may execute the I/O commands to read data from the storage devices or write data to the storage devices.

A point-in-time copy is a fully usable copy of a defined collection of data that includes an image of the data as it appeared at a single point-in-time. The point-in-time copy is considered to have logically occurred at the single point-in-time, but certain mechanisms may perform part or all of the copy at other times, as long as the result is a consistent copy of the data as it appeared at the single point-in-time. Prior to the use of point-in-time copy operations, in order to create a consistent copy of the data, a host application had to be stopped while the data was being physically copied. For large datasets, this caused stoppages of several hours, and made the process of making copies of large datasets very inconvenient for users. Point-in-time copy operations allow a copy to be created with almost no impact on the host application. Except for a brief period of a few milliseconds or seconds while the point-in-time copy is established, the host application can continue running. For example Flash-Copy* supported by International Business Machines (IBM) is a point-in-time copy mechanism that makes it possible to create, nearly instantaneously, point-in-time snapshot copies of entire logical volumes or data sets.

* IBM, zSeries, pSeries, xSeries, BladeCenter, WebSphere, and DB2, Flash-Copy are trademarks or International Business Machines Corporation registered in many jurisdictions worldwide.

SUMMARY OF THE PREFERRED EMBODIMENTS

Provided are a method, system, and computer program product in which a storage controller receives a command from a host application to perform a point-in-time backup of a source dataset to a storage cloud. The storage controller generates a target dataset via a point-in-time copy of the source dataset, and a mapping that indicates a correspondence between locations of the source dataset and locations of the target dataset. The storage controller copies the target dataset to the storage cloud to generate a backup dataset that is the point-in-time backup of the source dataset, where the backup dataset is accessible via reference to the locations of the source dataset. As a result, the storage controller rather than a host performs the point-in-time backup of the source dataset to the storage cloud.

In further embodiments, the host application executes in a host computational device that is coupled to the storage controller, where operations for performing the point-in-time backup of the source dataset to the storage cloud is offloaded to the storage controller from the host computational device. The storage controller copies the target dataset to the storage cloud without transmitting extents, tracks, or other storage entities of the target dataset to the host computational device. As a result, operations for generating the point-in-time backup are offloaded to the storage controller.

In certain embodiments, the point-in-time backup of the source dataset to the storage cloud is performed by a virtual concurrent copy session, where in response to termination of the virtual concurrent copy session, resources allocated for the mapping that indicates the correspondence between locations of the source dataset and locations of the target dataset are freed. As a result, resources that are not needed by the storage controller are freed.

In additional embodiments, the storage controller receives an input/output (I/O) request from a host computational device. In response to determining that a track corresponding to the I/O request has been updated in the target dataset, the storage controller sends the I/O request to target dataset extents for the track. As a result, the I/O request is satisfied by the target dataset.

In yet additional embodiments, the storage controller receives an input/output (I/O) request from a host computational device. In response to determining that a track corresponding to the I/O request has not been updated in the target dataset, the storage controller sends the I/O request to source dataset extents for the track. As a result, the I/O request is satisfied by the source dataset.

In certain embodiments, the mapping that indicates a correspondence between the locations of the source dataset and the locations of the target dataset maps individual extents, or extent ranges, or volumes and associated cylinder ranges via one to one, many to one, and one to many correspondences. As a result, the mapping may be used for different types of representation of storage.

Provided also is a cloud computing system, comprising a storage cloud, a storage controller coupled to the storage cloud, and a host coupled to the storage controller. In the cloud computing system a storage controller receives a command from a host application to perform a point-in-time backup of a source dataset to a storage cloud. The storage controller generates a target dataset via a point-in-time copy of the source dataset, and a mapping that indicates a correspondence between locations of the source dataset and locations of the target dataset. The storage controller copies the target dataset to the storage cloud to generate a backup dataset that is the point-in-time backup of the source dataset, where the backup dataset is accessible via reference to the locations of the source dataset. As a result, the virtual concurrent copy is performed in a cloud computing system.

Provided also is a host computational device, comprising a memory, and a processor coupled to the memory, where the processor transmits a command from a host application to a storage controller to perform a point-in-time backup of a source dataset to a storage cloud, and where the storage controller generates a target dataset via a point-in-time copy of the source dataset, and a mapping that indicates a correspondence between locations of the source dataset and locations of the target dataset, and copies the target dataset to the storage cloud to generate a backup dataset that is the point-in-time backup of the source dataset. The host application accesses the backup dataset via reference to the locations of the source dataset. As a result, the host computational device offloads the performing of virtual concurrent copy to a storage controller.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Backup and archiving solutions may include an object storage cloud as an offline tier. Certain solutions target inactive data that may be moved from the online storage tier to the offline storage tier. This is referred to as archiving, and the data is moved to the offline cloud tier and deleted from primary direct access storage devices (DASD). Since data is inactive there are no users or applications that have accessed the data for some period of time, so locking the dataset for the time it takes to perform the archiving does not disrupt operations.

A backup is different from an archive in that after a dataset is moved to an offline cloud tier the dataset is also maintained in the online DASD tier for users and applications to access the dataset. For backup, the dataset should only be locked and inaccessible to users and applications for as short a period of time as possible. Certain embodiments provide mechanisms to back up datasets to an object storage cloud with minimal interruption to users and applications that access the dataset.

Concurrent copy refers to a mechanism that allows a user to generate a copy of the data while applications are updating that data. Virtual concurrent copy mechanisms extend the concurrent copy mechanisms, and in virtual concurrent copy mechanisms a point-in-time copy of the data is made from a source location to an intermediate location, and the data is gradually copied from the intermediate location to target location via standard I/O methods. The virtual concurrent copy operation is logically complete after the source data is instantaneously copied (i.e., copied via point-in-time copy mechanisms) to the intermediate location, and is physically complete after the data is moved to the target media of the target location. Certain embodiments provide mechanisms for a point-in-time backup to an object storage cloud using a modified virtual concurrent copy mechanism. A backup to an offline cloud tier is performed as a two pass process. The first pass gathers the extents of the source dataset and establishes a point-in-time copy session of the tracks of these extents. The second pass issues a command to the storage controller to offload the tracks from the target of the point in time copy to the offline cloud tier. In certain embodiments, the modified virtual concurrent copy operations for generating point-in-time backup to a storage cloud are performed by a storage controller. The host offloads the responsibility of generating the point-in-time backup to the storage controller.

Exemplary Embodiments

Figure 1:
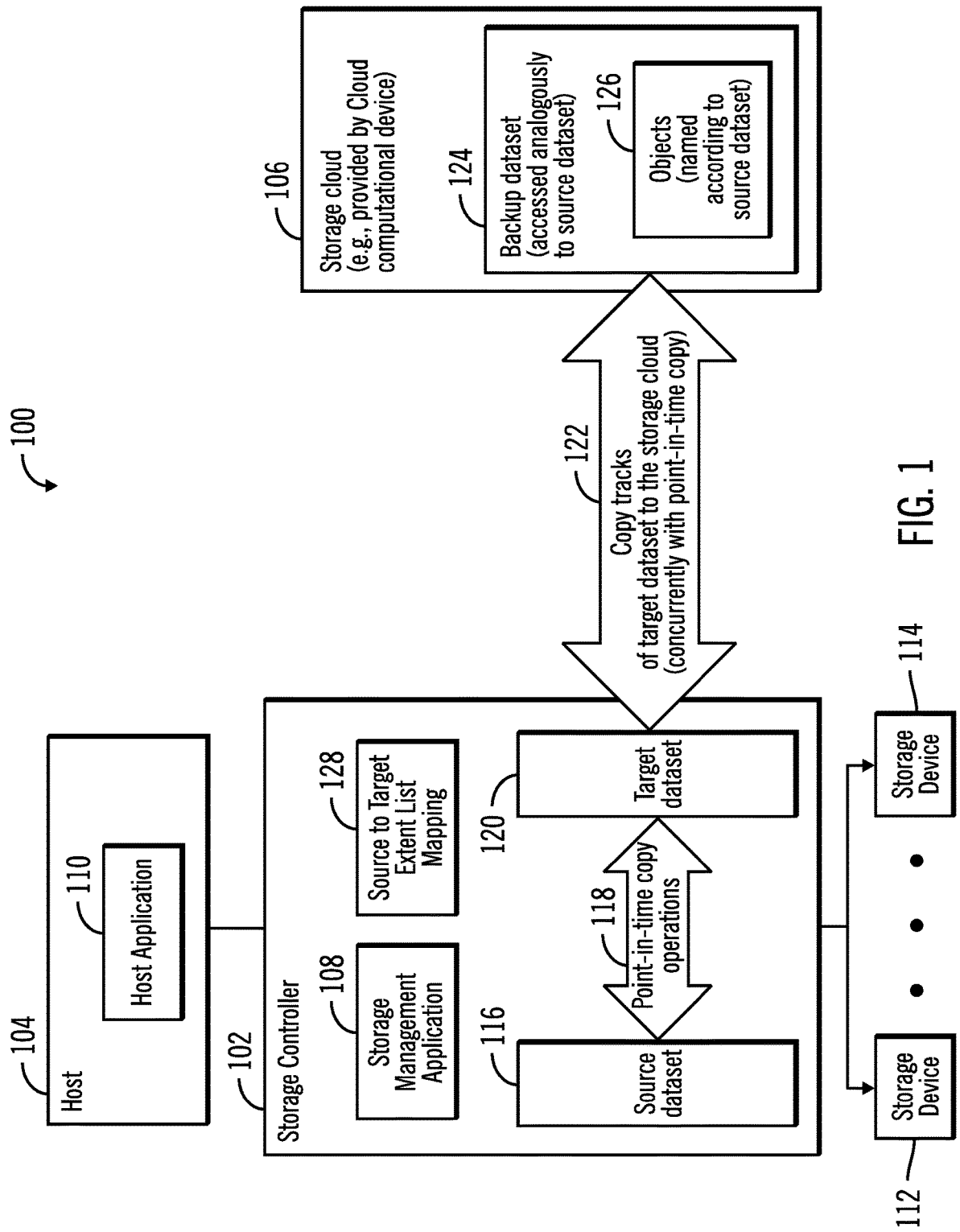
FIG. 1 illustrates a block diagram of a computing environment comprising a storage controller coupled to one or more hosts and a storage cloud, in accordance with certain embodiments.

FIG. 1 illustrates a block diagram of a computing environment 100 comprising a storage controller 102 coupled to one or more hosts 104 and a storage cloud 106, in accordance with certain embodiments.

The storage controller 102 and the host 104 may comprise any suitable computational device including those presently known in the art, such as, a personal computer, a workstation, a server, a mainframe, a hand held computer, a palm top computer, a telephony device, a network appliance, a blade computer, a processing device, a controller, etc. The storage cloud 106 may be comprised of a plurality of storage devices (not shown), such as storage disks, tape drives, solid state disks, etc., and a computational device (not shown) that controls access to the plurality of storage devices of the storage cloud 106.

The storage controller 102, the host 104, and the storage cloud 106 may be elements in any suitable network, such as, a storage area network, a wide area network, the Internet, an intranet, etc. In certain embodiments, the storage controller 102, the host 104, and the storage cloud 106 may be elements in a cloud computing environment.

A storage management application 108 that executes in the storage controller 102 receives I/O commands from one or more host applications 110 that execute in the host 104 and responds to the I/O commands by reading or writing data with respect to storage volumes stored the storage cloud 106 or in storage devices 112, 114 coupled to the storage controller 102, where the storage devices 112, 114 may be comprised of hard disks, solid state disks, or other storage devices. In certain embodiments, the storage management application 108 and the host application 110 may be implemented in software, hardware, firmware or any combination thereof.

In certain embodiments, the host application 110 that executes in the host 104 sends a request to the storage controller 102 to perform a point-in-time backup of a source dataset 116 whose logical storage volumes are controlled by the storage controller 102 and accessed by the host application 110 via the storage controller 102. The source dataset 116 may comprise a collection of data records stored in extents, tracks, blocks, or any other type of units in which storage may be represented. In certain embodiments, the storage management application 108 of the storage controller 102 generates a point-in-time copy of the source dataset 116 via point-in-time copy operations 118, where the point-in-time copy is stored in a target dataset 120. The storage management application 108 copies tracks (or other units, such as blocks, extents, etc.) of the target dataset 120 to the storage cloud 106 to generate a backup dataset 124 in the storage cloud, concurrently with the point-in-time copy operations 118. The objects 126 of the backup dataset 124 may be named according to the source dataset 116 even though they have been copied from the target dataset 120, where the naming according to the source dataset 116 is performed by using a source to target extent list mapping 128 that is generated during the point-in-time copy operations 118.

Therefore, FIG. 1 illustrates certain embodiments in which a point-in-time backup copy of a source dataset 116 is made to a storage cloud 106 by the storage controller 102. In prior art, the copying of the tracks of the target dataset 120 to the backup dataset 124 was performed by the host 104 by receiving from the storage controller 102 the data stored in the tracks of the target dataset 120 and then copying the received data to the backup dataset 124. Additionally, there was no provision for maintaining the source to target extent list mapping 128 in the prior art.

Figure 2:
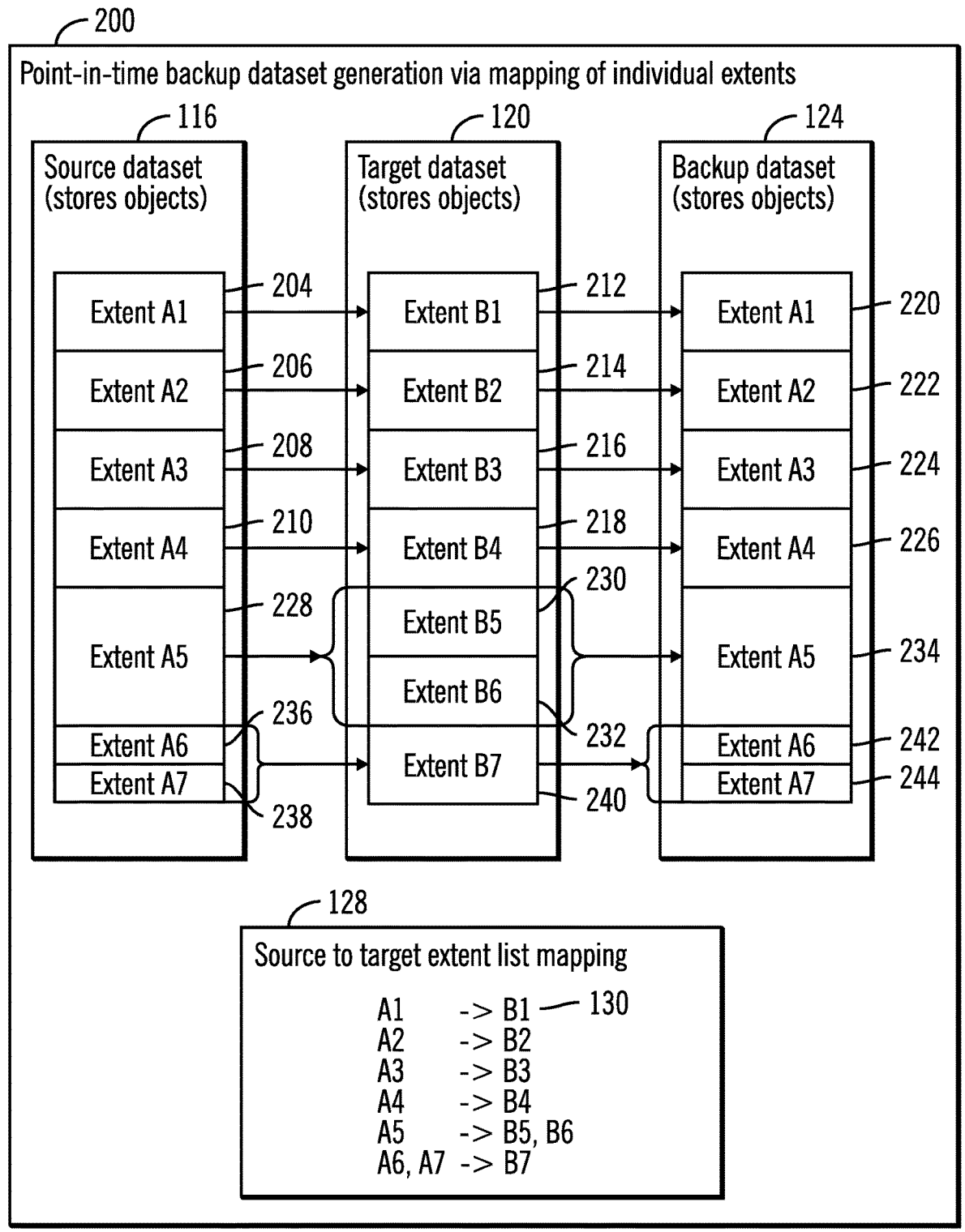
FIG. 2 illustrates a block diagram that shows the generation of a point-in-time backup dataset via mapping of individual extents, in accordance with certain embodiments.

FIG. 2 illustrates a block diagram 200 that shows the generation of a point-in-time backup dataset via mapping of individual extents, in accordance with certain embodiments.

In FIG. 2, four source dataset objects shown as extents A1, A2, A3, A4 204, 206, 208, 210 of the source data set 116 are copied via point-in-time copy operations to four corresponding dataset objects shown as extents B1, B2, B3, B4 212, 214, 216, 218 of the target dataset 120. The dataset objects shown as extents B1, B2, B3, B4 212, 214, 216, 218 of the target dataset 120 are concurrently copied to the backup dataset 124 but renamed as extents A1, A2, A3, A4 220, 222, 224, 226 by using the source to target extent list mapping 128 which shows the correspondences 130 between the names of the source extents and the target extents.

Additionally, FIG. 2 also shows that a large extent A5 228 of the source dataset 116 may be copied via point-in-time copy operations to two smaller extents B5, B6 230, 232 of the target dataset 120. The dataset object shown as extents B5, B6 230, 232 of the target dataset 120 are concurrently copied to the backup dataset 124 but renamed as extent A5 234 by using the source to target extent list mapping 128 which shows the correspondences 130 between the names of the source extents and the target extents.

Furthermore, FIG. 2 also shows that two small extents A6, A7 236, 238 of the source dataset 116 may be copied via point-in-time copy operations to a large extent B7 240 of the target dataset 120. The dataset object shown as extent B7 240 of the target dataset 120 is concurrently copied to the backup dataset 124 but renamed as extents A6, A7 242.244 by using the source to target extent list mapping 128 which shows the correspondences 130 between the names of the source extents and the target extents.

As a result, the objects of the backup dataset 124 have the same names as the objects of the source dataset 116 and do not have the names of the objects of the target dataset 120. As a result, the backup dataset 124 may be accessed with same object names as the source dataset 116. It may be noted that the correspondences 130 between the names of the source extents and the target extents may be one to one, one to many or many to one.

Figure 3:
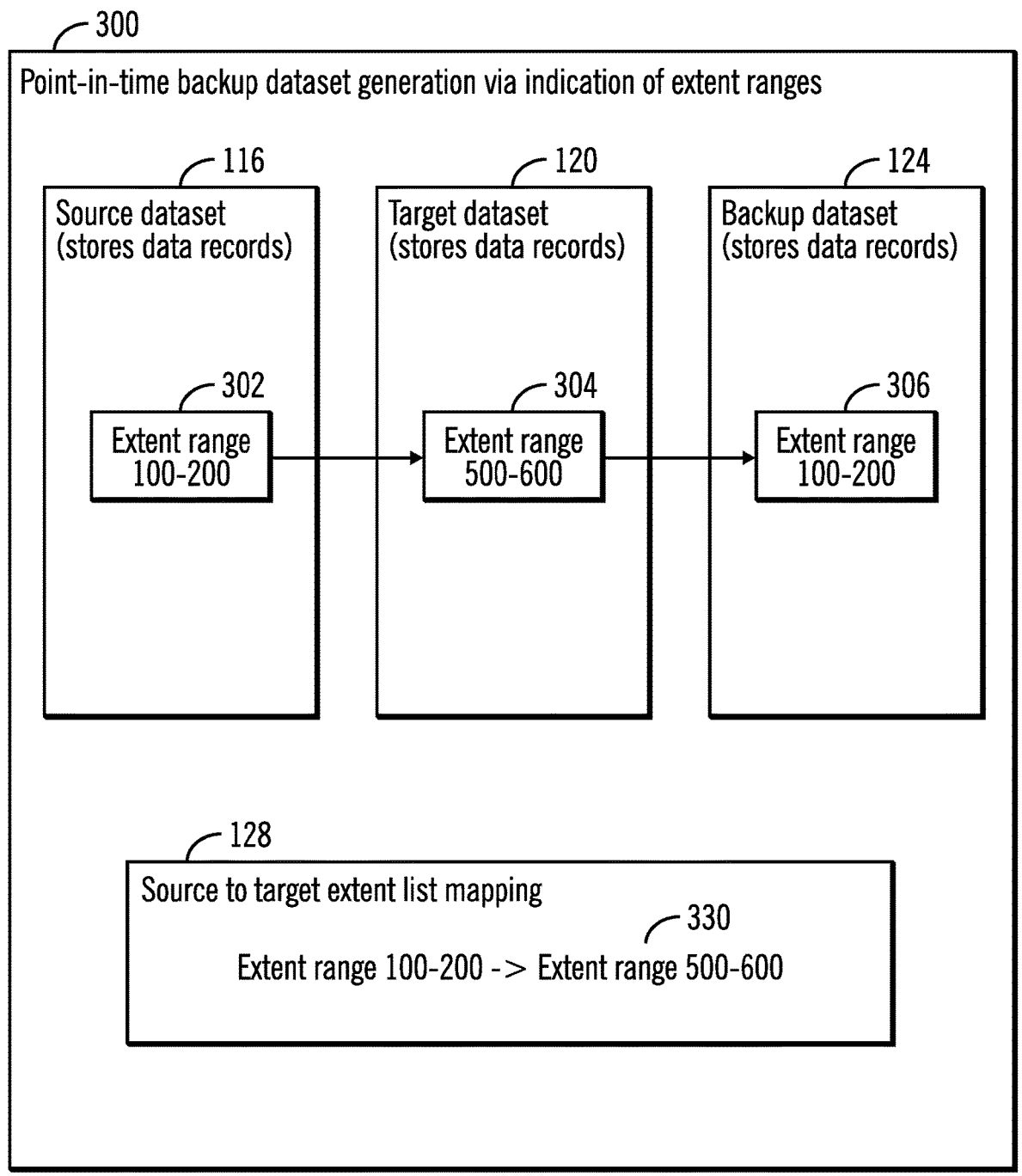
FIG. 3 illustrates a block diagram that shows the generation of a point-in-time backup dataset via mapping of extent ranges, in accordance with certain embodiments.

FIG. 3 illustrates a block diagram 300 that shows the generation of a point-in-time backup dataset via mapping of extent ranges, in accordance with certain embodiments.

In FIG. 3, the data records stored in the source dataset 116 are in an extent range 100-200 (shown via reference numeral 302) and are copied via point-in-time copy operations into the target dataset 120 into data records that are in extent range 500-600 (shown via reference numeral 304). However, when the target dataset 120 is concurrently copied to the backup dataset 124, then the extent range 500-600 is indicated as being in extent range 100-200 (shown via reference numeral 306) in the backup dataset 124, by using the source to target extent list mapping 128 that has the mapping 330 that indicates that extent range 100-200 of the source dataset 116 has been mapped to extent range 500-600 of the target dataset 120. As a result, the backup dataset 124 may be accessed with same extent ranges as the source dataset 116.

Figure 4:
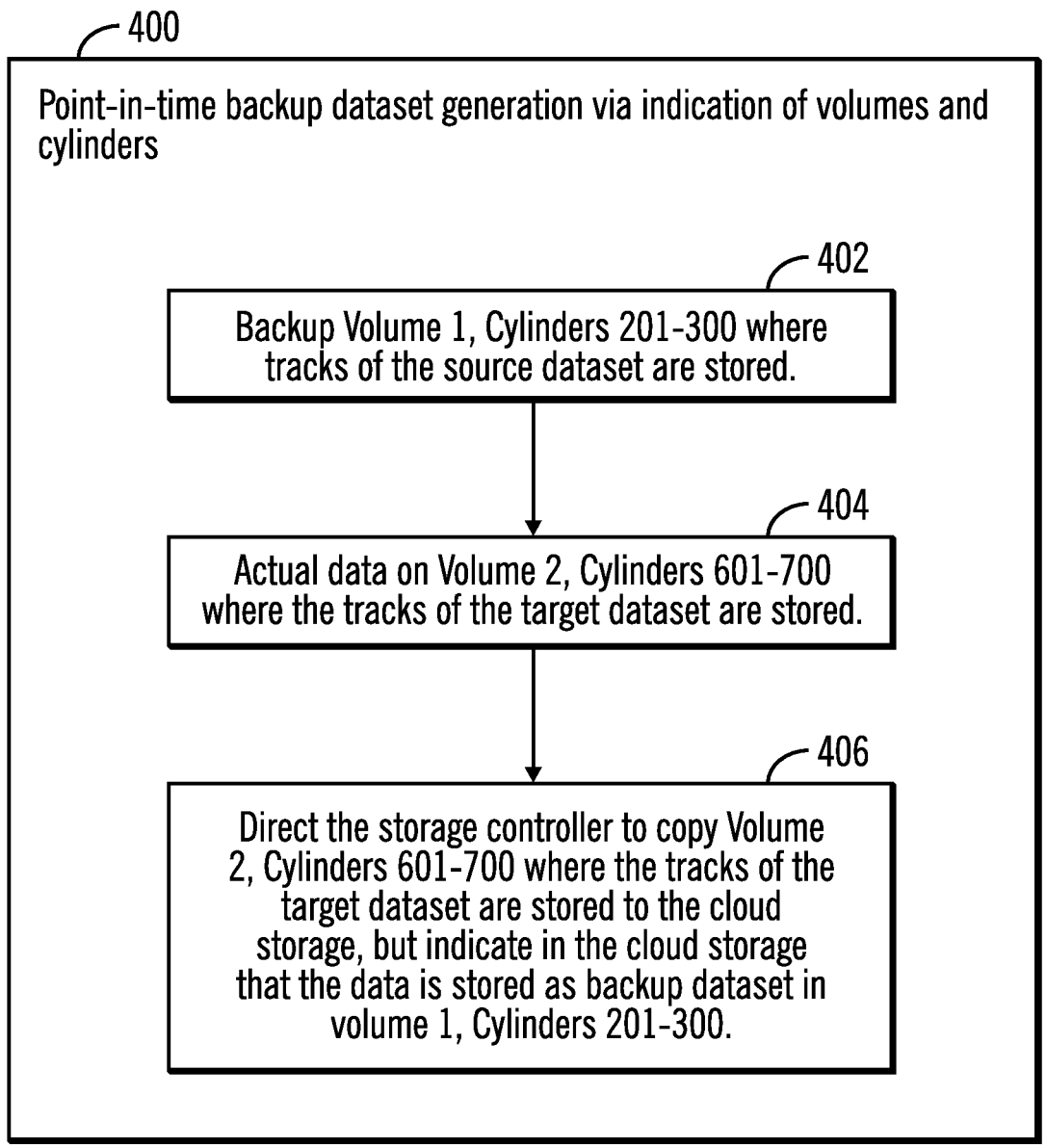
FIG. 4 illustrates a block diagram that shows the generation of a point-in-time backup dataset via mapping of volumes and cylinders, in accordance with certain embodiments.

FIG. 4 illustrates a diagram 400 that shows the generation of a point-in-time backup dataset via mapping of volumes and cylinders, in accordance with certain embodiments.

Control starts at block 402 in which the storage controller 102 receives a command from the host 104 to backup Volume 1, Cylinders 201-300 where tracks of the source dataset 116 are stored. As a result of the point-in-time copy operations 118, the point-in-time copy data is stored on Volume 2, Cylinders 601-700 where the tracks of the target dataset 120 are stored (as shown via reference numeral 404). The storage controller 102 is directed to copy (at block 406) Volume 2, Cylinders 601-700 where the tracks of the target dataset 120 are stored, to the storage cloud 106, but an indication is made in the storage cloud 106 that the data is stored as backup dataset in volume 1, Cylinders 201-300. The indication may be made by using the mapping 128 or via other mechanisms. As a result, the backup dataset 124 may be accessed with the same volume name and cylinder range as the source dataset 116.

Figure 5:
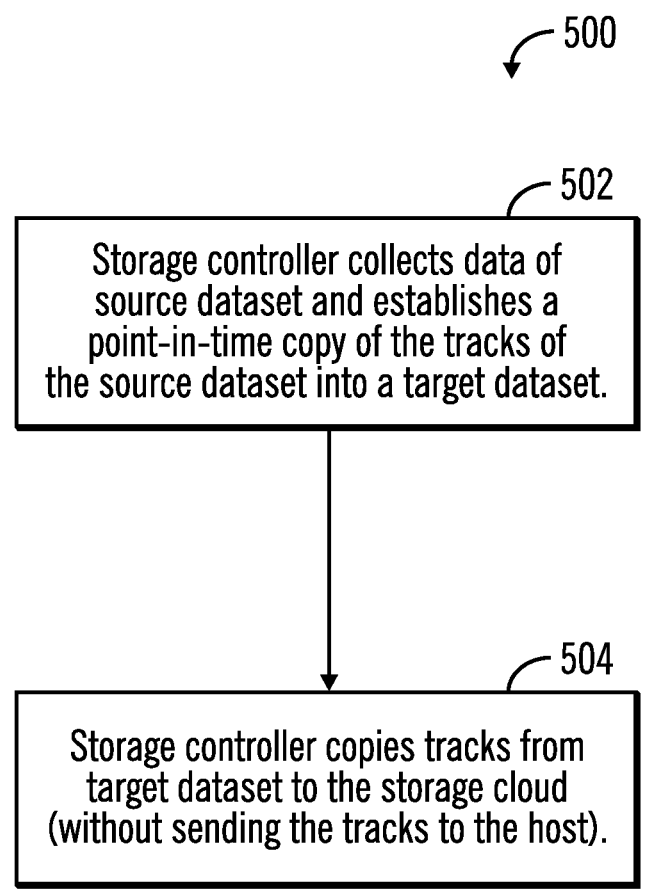
FIG. 5 illustrates a first flowchart that shows generation of a point-in-time backup dataset, in accordance with certain embodiments.

FIG. 5 illustrates a first flowchart 500 that shows generation of a point-in-time backup dataset, in accordance with certain embodiments. The operations shown in FIG. 5 may be performed by the storage controller 102.

Control starts at block 502 in which the storage controller 102 collects data of the source dataset 116 and establishes a point in time copy of the tracks of the source dataset 116 into the target dataset 120. Control proceeds to block 504 in which the storage controller 102 copies the tracks from the target dataset 120 to the storage cloud 106, without sending the tracks of the target dataset 120 to the host 104.

Figure 6:
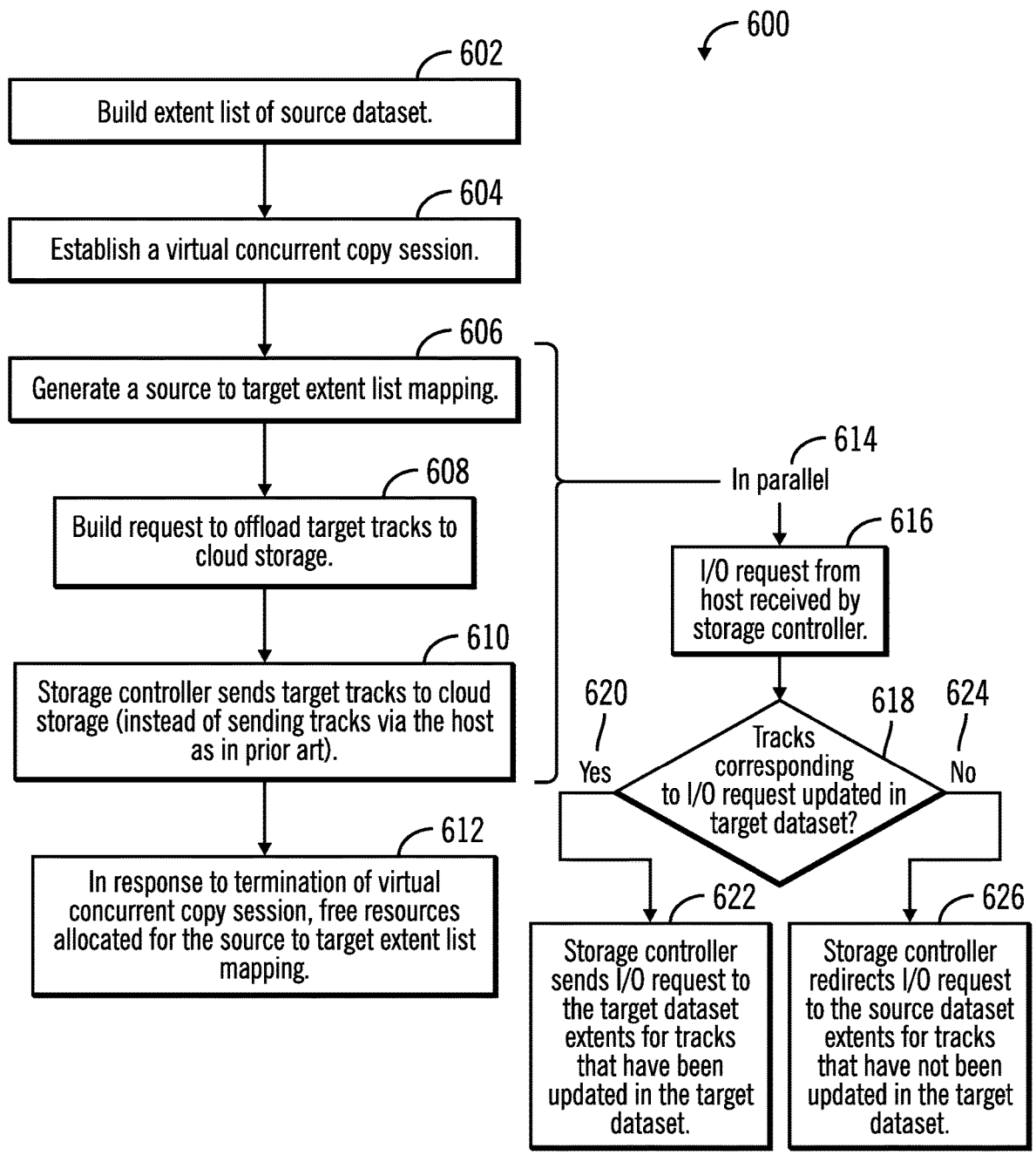
FIG. 6 illustrates a second flowchart that shows generation of a point-in-time backup dataset, in accordance with certain embodiments.

FIG. 6 illustrates a second flowchart 600 that shows generation of a point-in-time backup dataset, in accordance with certain embodiments. The operations shown in FIG. 6 may be performed by the storage controller 102.

Control starts at block 602 in which the storage controller 102 builds an extent list of the source dataset 116, and establishes (at block 604) a virtual concurrent copy session. The storage controller 102 generates (at block 606) the source to target extent list mapping 128, and builds a request to offload target tracks to cloud storage (at block 608).

From block 608 control proceeds to block 610 in which the storage controller 102 sends target tracks to cloud storage 106 (instead of sending tracks via the host 104 as in prior art).

After an interval of time, in response to termination of the virtual concurrent copy session, resources allocated for the source to target extent list mapping 128 are freed (at block 612) as they are no longer of any use and as a result memory is freed.

In parallel with the operations being performed in blocks 606, 608, 610 (shown via reference numeral 614), control may proceed to block 616. In block 616, an I/O request from the host 104 is received by the storage controller 102. A determination is made (at block 618) as to whether tracks corresponding to the I/O request have been updated in the target dataset 120. If so ("Yes" branch 620) control proceeds to block 622 in which the storage controller 102 sends the I/O request to the target dataset extents for tracks that have been updated in the target dataset 120.

If at block 618, it is determined that tracks corresponding to the I/O request have not been updated in the target dataset 120 ("No" branch 624) then control proceeds to block 626 in which the storage controller 102 redirects I/O requests to the source dataset extents for tracks that have not been updated in the target dataset 120.

Therefore, FIG. 6 illustrates certain embodiments in which a backup dataset 124 is generated under the control of a storage controller 102 via a combination of a point-in-time copy of the source dataset 116 to the target dataset 120, and a concurrent copy from the target dataset 120 to the backup dataset 126, with the process being referred to as a virtual concurrent copy under the control of the storage controller.

Figure 7:
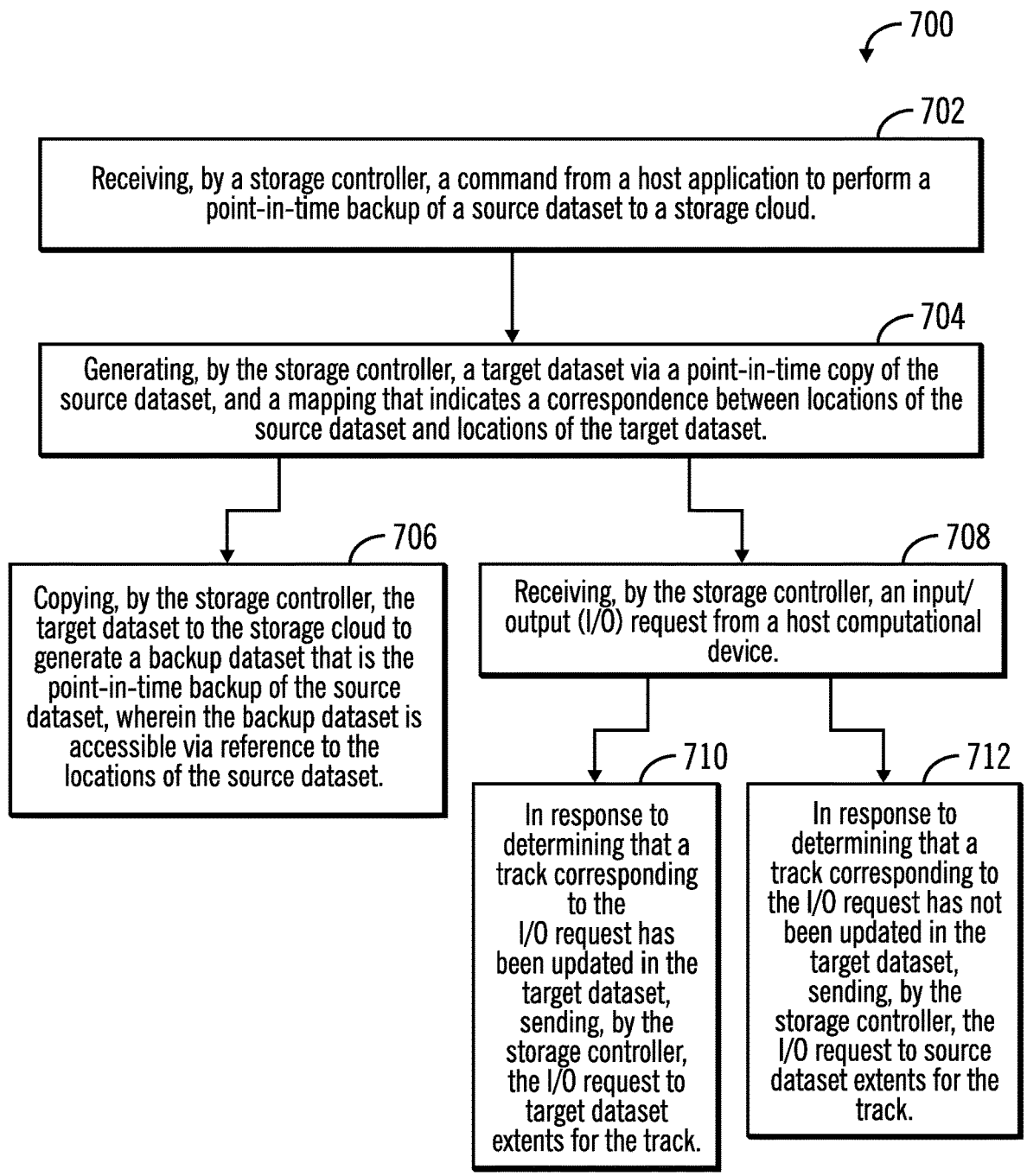
FIG. 7 illustrates a third flowchart that shows generation of a point-in-time backup dataset, in accordance with certain embodiments.

FIG. 7 illustrates a third flowchart 700 that shows generation of a point-in-time backup dataset, in accordance with certain embodiments. The operations shown in FIG. 7 may be performed by the storage controller 102.

Control starts at block 702 in which a storage controller 102 receives a command from a host application 110 to perform a point-in-time backup of a source dataset 116 to a storage cloud 106. The storage controller 102 generates (at block 704) a target dataset 120 via a point-in-time copy of the source dataset 116 and a mapping 128 that indicates a correspondence between locations of the source dataset and locations of the target dataset.

From block 704 control proceeds to block 706 in which the storage controller 102 copies the target dataset 120 to the storage cloud 106 to generate a backup dataset 124 that is the point-in-time backup of the source dataset 116, where the backup dataset 124 is accessible via reference to the locations of the source dataset.

From block 704 control may also proceed to block 708 in which the storage controller 102 receives an I/O request from a host computational device 104. From block 708, control may proceed in parallel to block 710, 712.

At block 710, in response to determining that a track corresponding to the I/O request has been updated in the target dataset 120, the storage controller 102 sends the I/O request to target dataset extents for the track, and the I/O request is satisfied by the target dataset 120.

At block 712, in response to determining that a track corresponding to the I/O request has not been updated in the target dataset 120, the storage controller 102 sends the I/O request to source dataset extents for the track, and the I/O request is satisfied by the source dataset 116.

Therefore, in FIGS. 1-7, the operations for performing the point-in-time backup of the source dataset 116 to the storage cloud 106 is offloaded to the storage controller 102 from the host computational device 104. The storage controller 102 copies the target dataset 120 to the storage cloud 106 without transmitting extents, tracks, or other storage entities of the target dataset 120 to the host computational device 104. In certain embodiments, a mapping 128 indicates a correspondence between the locations of the source dataset and the locations of the target dataset, where the mapping maps individual extents, or extent ranges, or volumes and associated cylinder ranges. The mapping 128 is used to name the backup dataset 124 to reflect locations of the source dataset 116, and as a result the backup dataset 124 is accessed analogously to the source dataset 116.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
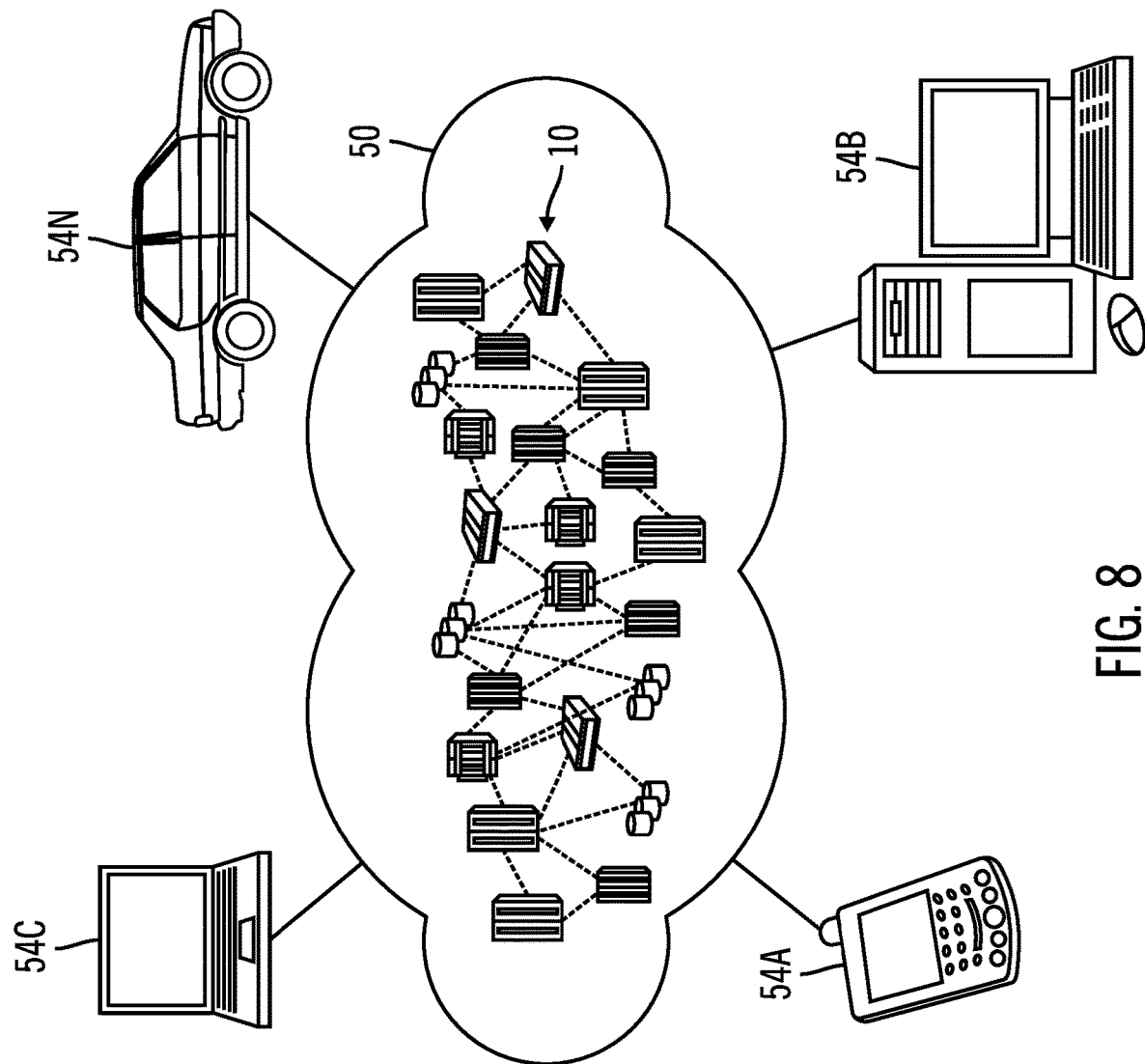
FIG. 8 illustrates a block diagram of a cloud computing environment, in accordance with certain embodiments.

Referring now to FIG. 8, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
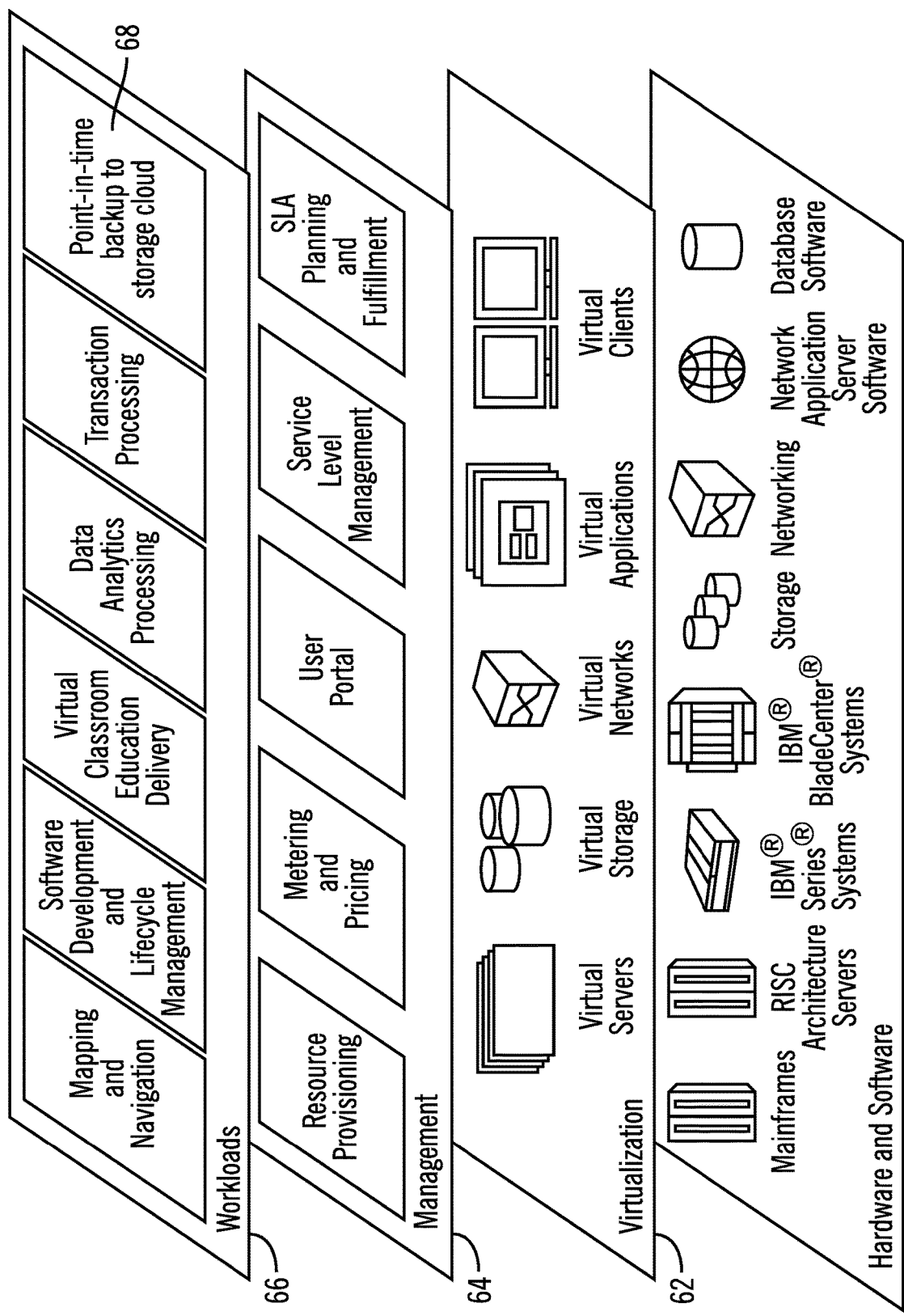
FIG. 9 illustrates a block diagram of further details of the cloud computing environment of FIG. 8, in accordance with certain embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and point-in-time backup to storage cloud 68 as shown in FIGS. 1-8.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
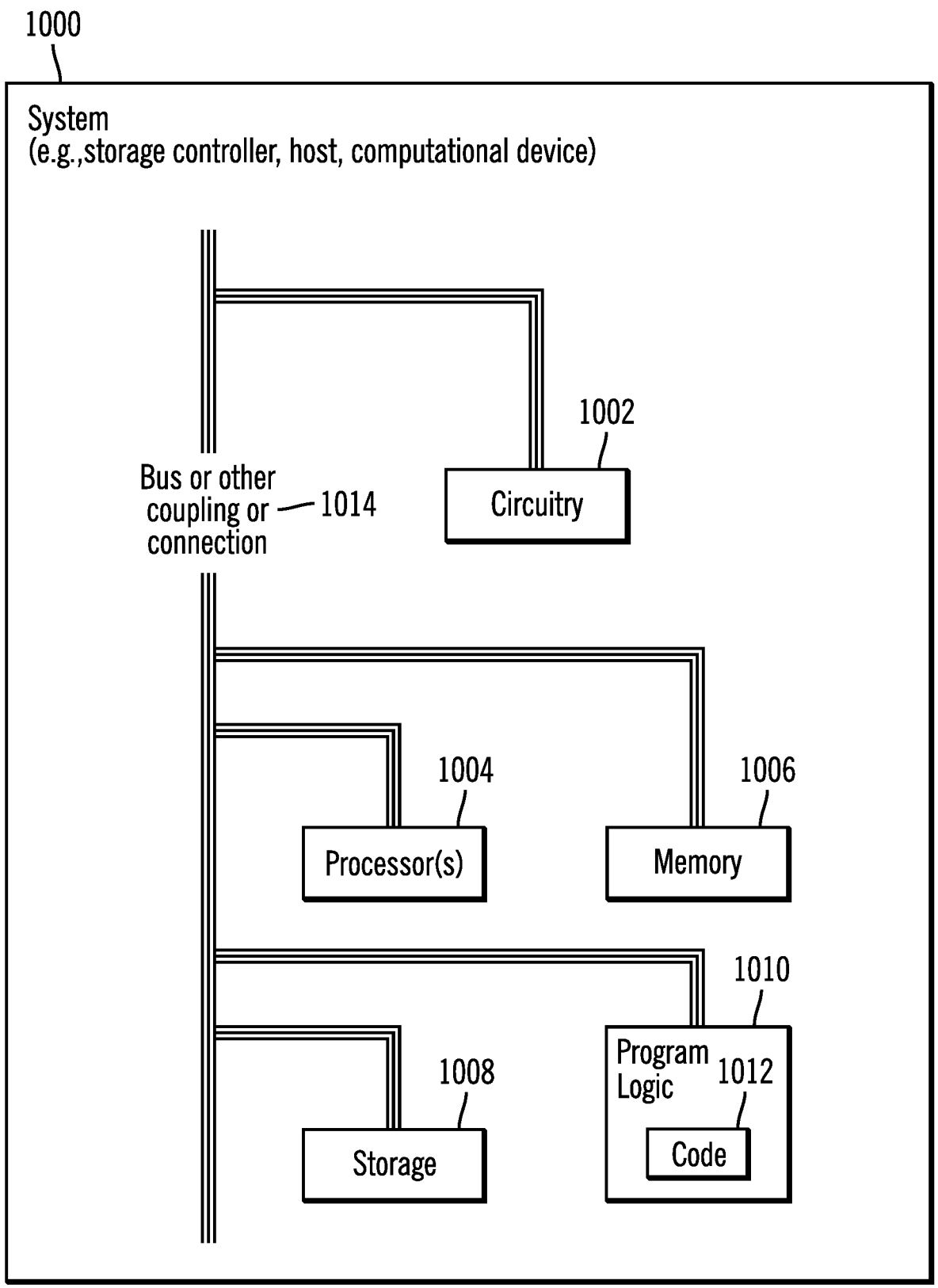
FIG. 10 illustrates a block diagram of a computational system that shows certain elements that may be included in the storage controllers, the host(s), and/or the storage cloud as described in FIGS. 1-9, in accordance with certain embodiments.

FIG. 10 illustrates a block diagram that shows certain elements that may be included in the storage controller 102, the hosts 104, or other computational devices in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. One or more of the components in the system 1000 may communicate via a bus or via other coupling or connection 1014. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment". "embodiment", "embodiments", "the embodiment", "the embodiments". "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a". "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    generating, by a storage controller, a target dataset via a point-in-time copy of a source dataset, wherein a mapping indicates a correspondence between one or more first locations of the source dataset and one or more second locations of the target dataset, wherein data stored in the one or more first locations of the source dataset are copied to the one or second locations of the target dataset via the point-in-time copy; and
    copying, by the storage controller, the target dataset to a storage cloud to generate a backup dataset that is a point-in-time backup of the source dataset, wherein during the copying of the target dataset to the storage cloud to generate the backup dataset, data stored in the one or more second locations of the target dataset are copied to one more third locations of the backup dataset, and wherein the one or more third locations of the backup dataset are assigned one or more identical names to the one or more first locations of the source dataset from the mapping.

2. The method of claim 1, wherein in the point-in-time backup of the source dataset to the storage cloud is performed by a virtual concurrent copy session, the method further comprising:
    in response to termination of the virtual concurrent copy session, freeing resources allocated for the mapping that indicates correspondence between the one or more first locations of the source dataset and the one or more second locations of the target dataset.

3. The method of claim 1, the method further comprising:
    receiving, by the storage controller, an input/output (I/O) request from a host computational device; and
    in response to determining that a track corresponding to the I/O request has been updated in the target dataset, sending, by the storage controller, the I/O request to target dataset extents for the track.

4. The method of claim 1, the method further comprising:
    receiving, by the storage controller, an input/output (I/O) request from a host computational device; and
    in response to determining that a track corresponding to the I/O request has not been updated in the target dataset, sending, by the storage controller, the I/O request to source dataset extents for the track.

5. The method of claim 1, wherein the mapping maps individual extents, or extent ranges, or volumes and associated cylinder ranges via one to one, many to one, and one to many correspondences.

6. The method of claim 1, wherein the mapping indicates that a first named extent of the source dataset has been copied to a second named extent and a third named extent of the target dataset via the point-in-time copy, and wherein during the copying of the target dataset to the storage cloud to generate the backup dataset, the second named extent and the third named extent of the target dataset are copied from the target dataset to the storage cloud to one extent of the backup dataset, and wherein the one extent of the backup dataset is assigned an identical name to the first named extent of the source dataset from the mapping.

7. A system, comprising:
    a memory; and
    a processor coupled to the memory, wherein the processor performs operations, the operations comprising:
    generating a target dataset via a point-in-time copy of a source dataset, wherein a mapping indicates a correspondence between one or more first locations of the source dataset and one or more second locations of the target dataset, wherein data stored in the one or more first locations of the source dataset are copied to the one or second locations of the target dataset via the point-in-time copy; and
    copying the target dataset to a storage cloud to generate a backup dataset that is a point-in-time backup of the source dataset wherein during the copying of the target dataset to the storage cloud to generate the backup dataset, data stored in the one or more second locations of the target dataset are copied to one more third locations of the backup dataset, and wherein the one or more third locations of the backup dataset are assigned one or more identical names to the one or more first locations of the source dataset from the mapping.

8. The system of claim 7, wherein in the point-in-time backup of the source dataset to the storage cloud is performed by a virtual concurrent copy session, the operations further comprising:
    in response to termination of the virtual concurrent copy session, freeing resources allocated for the mapping that indicates correspondence between the one or more first locations of the source dataset and the one or more second locations of the target dataset.

9. The system of claim 7, the operations further comprising:
    receiving an input/output (I/O) request from a host computational device; and
    in response to determining that a track corresponding to the I/O request has been updated in the target dataset, sending the I/O request to target dataset extents for the track.

10. The system of claim 7, the operations further comprising:
    receiving an input/output (I/O) request from a host computational device; and
    in response to determining that a track corresponding to the I/O request has not been updated in the target dataset, sending the I/O request to source dataset extents for the track.

11. The system of claim 7, wherein the mapping maps individual extents, or extent ranges, or volumes and associated cylinder ranges via one to one, many to one, and one to many correspondences.

12. The system of claim 7, wherein the mapping indicates that a first named extent of the source dataset has been copied to a second named extent and a third named extent of the target dataset via the point-in-time copy, and wherein during the copying of the target dataset to the storage cloud to generate the backup dataset, the second named extent and the third named extent of the target dataset are copied from the target dataset to the storage cloud to one extent of the backup dataset, and wherein the one extent of the backup dataset is assigned an identical name to the first named extent of the source dataset from the mapping.

13. A computer program product, the computer program product comprising a computer readable storage medium having computer readable program code embodied therewith, the computer readable program code configured to perform operations, the operations comprising:

generating, by a storage controller, a target dataset via a point-in-time copy of a source dataset, wherein a mapping indicates a correspondence between one or more first locations of the source dataset and one or more second locations of the target dataset, wherein data stored in the one or more first locations of the source dataset are copied to the one or second locations of the target dataset via the point-in-time copy; and copying, by the storage controller, the target dataset to a storage cloud to generate a backup dataset that is a point-in-time backup of the source dataset, wherein during the copying of the target dataset to the storage cloud to generate the backup dataset, data stored in the one or more second locations of the target dataset are copied to one more third locations of the backup dataset, and wherein the one or more third locations of the backup dataset are assigned one or more identical names to the one or more first locations of the source dataset from the mapping.

14. The computer program product of claim 13, wherein in the point-in-time backup of the source dataset to the storage cloud is performed by a virtual concurrent copy session, the operations further comprising:

in response to termination of the virtual concurrent copy session, freeing resources allocated for the mapping that indicates correspondence between the one or more first locations of the source dataset and the one or more second locations of the target dataset.

15. The computer program product of claim 13, the operations further comprising:

receiving, by the storage controller, an input/output (I/O) request from a host computational device; and in response to determining that a track corresponding to the I/O request has been updated in the target dataset, sending, by the storage controller, the I/O request to target dataset extents for the track.

16. The computer program product of claim 13, the operations further comprising:

receiving, by the storage controller, an input/output (I/O) request from a host computational device; and in response to determining that a track corresponding to the I/O request has not been updated in the target dataset, sending, by the storage controller, the I/O request to source dataset extents for the track.

17. The computer program product of claim 13, wherein the mapping maps individual extents, or extent ranges, or volumes and associated cylinder ranges via one to one, many to one, and one to many correspondences.

18. The computer program product of claim 13, wherein the mapping indicates that a first named extent of the source dataset has been copied to a second named extent and a third named extent of the target dataset via the point-in-time copy, and wherein during the copying of the target dataset to the storage cloud to generate the backup dataset, the second named extent and the third named extent of the target dataset are copied from the target dataset to the storage cloud to one extent of the backup dataset, and wherein the one extent of the backup dataset is assigned an identical name to the first named extent of the source dataset from the mapping.

\* \* \* \* \*